No. 655,398. Patented Aug. 7, 1900.
E. FUNK.
CARBONATED BEVERAGE.
(Application filed June 3, 1899.)
(No Model.)
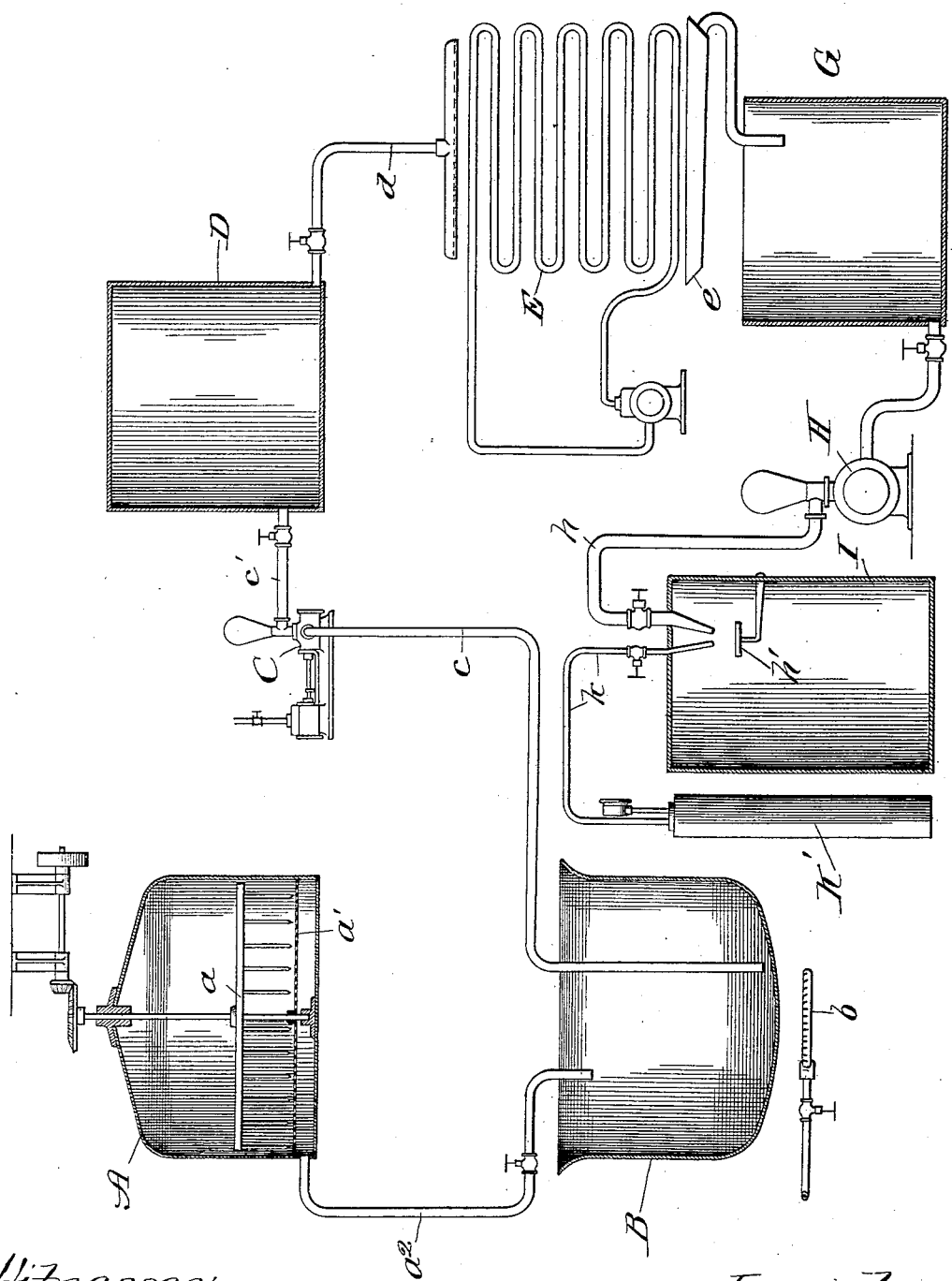

UNITED STATES PATENT OFFICE.

ERNST FUNK, OF CHICAGO, ILLINOIS.

CARBONATED BEVERAGE.

SPECIFICATION forming part of Letters Patent No. 655,398, dated August 7, 1900.

Application filed June 3, 1899. Serial No. 719,253. (No specimens.)

*To all whom it may concern:*

Be it known that I, ERNST FUNK, a citizen of the United States, residing at Chicago, in the county of Cook and State of Illinois, have invented certain new and useful Improvements in Carbonated Beverages, of which the following is a specification.

The object of my invention is to provide a simple, economical, and efficient process for making carbonated beverages similar to weiss-beer; and the invention consists in mashing malt with water under the conditions hereinafter specified and drawing off the malt mixture or liquor and subjecting the same to the further treatments hereinafter described and claimed.

In the accompanying drawing the figure is a diagrammatic view of one kind of apparatus and the arrangement thereof which may be used for the purpose of carrying out my process.

It is well known that weiss-beer is produced, very much in the same way as lager-beer and ale are produced, from malt and hops and is allowed to ferment, and as a consequence alcohol is produced and forms one of its constituents. In its appearance and taste, therefore, it is similar to lager-beer and ale and produces all the deleterious effects that such beverages produce. Again, it permits unscrupulous manufacturers to put a very poor material on the market, which as a consequence is injurious to the health of the drinking public. My process therefore is intended, primarily, to produce a beverage similar to weiss-beer which has none of its deleterious effects and although formed of some of the materials which go to form the ordinary weiss-beer is non-alcoholic, while giving to the user all the strength that malt and hops can give, as will more fully hereinafter appear.

In carrying out my process I first mash up malt and water at the desired temperature to make an extract of malt. I then run this extract into a copper kettle and boil it from two and one-half ($2\frac{1}{2}$) to three (3) hours. During a portion of this time I put in the hops and let them boil with the extract for at least one hour. I then cool off the boiled extract from 8° to 12° Réaumur, and next let it stand in a cool room at least one day with a temperature of 50° Fahrenheit. The liquid is then drawn off and charged with carbonic-acid gas and about one pound of sugar added to one barrel of the liquid while charging. The material is then ready for either bottling or putting up in kegs, preferably for bottling.

An apparatus and arrangement thereof for carrying out my process is shown in the drawing. The mash is produced in the mashing-tub A, which is of any of the ordinary constructions, having stirrers or beaters $a$ arranged to rotate therein above a perforated strainer-bottom $a'$. The mixture is then drawn off from this mash-tub through the pipe $a^2$, where it enters the boiling-kettle B. This boiling-kettle may have its heat produced by a gas-burner $b$. While the mixture is being boiled in this kettle, and it should be boiled from two and a half ($2\frac{1}{2}$) to three (3) hours, the hops are added and boiled with the material for at least one hour. The material is then pumped out of the kettle by the pump C through the pipe $c$ and forced into a stand-tank D through the pipe $c'$, where it is allowed to cool from 8° to 12° Réaumur. It is then discharged from such stand-pipe through the pipe $d$ and allowed to pass over the refrigerator-coils E, which cools it sufficiently, when it is caught in the pan $e$ and permitted to enter the storage-tank G at the desired temperature, 50° Fahrenheit, and in a cool room, where it should be allowed to stand at least one day at such even temperature. When it is ready for charging, the material is drawn from the stand-tank G and by means of the pump H is forced into the mixing vessel I through the pipe $h$, which has a small perforated opening. As the liquid leaves the pipe $h$ it impinges against the disk $h'$ and is converted into a spray, so that the carbonic-acid gas which enters the mixing vessel through the pipe K from the reservoir K', adjacent to the inlet of the liquid, will saturate the same— in other words, permit the liquid to take up its equivalent of carbonic-acid gas. A pound of sugar to each barrel of the liquid should be added during the mixing of liquid and gas. From this mixing vessel the carbonated beverage may be taken as desired and forced into desired packages, preferably bottles.

While I have described my invention with more or less minuteness as to the apparatus by which the process may be carried out, I do not desire to be limited thereto unduly or any more than is pointed out in the claims. On the contrary, I contemplate its use with any kind of apparatus which will permit the process to be carried out and produce the beverage without departing from the spirit of the invention.

I claim—

1. The process of making a carbonated beverage similar to weiss-beer without the presence of alcohol, which consists in first mashing malt with water in a mashing-tub, then drawing off the malt mixture into a boiling-kettle and boiling the same therein with hops for at least an hour, then withdrawing the malt and hop liquid from the kettle into a stand-tank and cooling the liquid therein from 8° to 12° Réaumur, then discharging the cooled liquid over a refrigerating-coil into a storage-tank, then retaining the liquid in such tank under a temperature of 50° Fahrenheit and then withdrawing and charging with carbonic-acid gas, substantially as described.

2. The process of making a carbonated beverage similar to weiss-beer without the presence of alcohol, which consists first in mashing malt with water in a mashing-tub, then drawing off the malt mixture into a boiling-kettle and boiling the same therein with hops for at least an hour, then withdrawing the malt and hop liquid from the kettle into a stand-tank and cooling the liquid therein from 8° to 12° Réaumur, then discharging the cooled liquid over a refrigerating-coil into a storage-tank, then retaining the liquid in such tank under a temperature of 50° Fahrenheit, and then withdrawing the liquid from the storage-tank and charging it with carbonic-acid gas with the addition of sugar while it is being charged, substantially as described.

ERNST FUNK.

Witnesses:
THOMAS A. SHERIDAN,
THOMAS B. MCGREGOR.